United States Patent [19]
Rittler

[11] Patent Number: 5,281,399
[45] Date of Patent: Jan. 25, 1994

[54] REFRACTORY BODY ASSEMBLY

[75] Inventor: Hermann Rittler, Corning, N.Y.

[73] Assignee: Corning Incorporated, Corning, N.Y.

[21] Appl. No.: 732,906

[22] Filed: Jul. 19, 1991

Related U.S. Application Data

[63] Continuation-in-part of Ser. No. 630,813, Dec. 20, 1990, abandoned.

[51] Int. Cl.$^5$ .............................................. B01D 53/36
[52] U.S. Cl. ................................... 422/179; 422/171; 422/177; 422/181; 422/222
[58] Field of Search ............... 422/171, 177, 179, 180, 422/181, 222

[56] References Cited

U.S. PATENT DOCUMENTS

| | | | |
|---|---|---|---|
| 3,762,935 | 10/1973 | Leach | 106/40 |
| 3,991,254 | 11/1976 | Takeuchi | 422/179 X |
| 4,285,909 | 8/1981 | Mizusawa et al. | 422/179 |
| 4,413,062 | 11/1983 | Huseby et al. | 501/123 |
| 4,511,773 | 4/1985 | Heft et al. | 200/144 C |
| 4,925,634 | 5/1990 | Yokokoji et al. | 422/179 |

OTHER PUBLICATIONS

The Condensed Chemical Dictionary, 8th Ed. Van Nostrand Reinhold Co., New York, p. 123.

*Primary Examiner*—Robert J. Warden
*Assistant Examiner*—Amalia Santiago
*Attorney, Agent, or Firm*—Milton M. Peterson; Clinton S. Janes, Jr.

[57] ABSTRACT

A refractory body assembly includes a refractory container, a refractory body having multiple gas passageways and positioned within the container, and a barrier layer in the intermediate space. The barrier layer is a rigid foam which, in a basic form, may be composed essentially of a crystalline aluminum phosphate, and may be produced by heating a mixture of a source of phosphorous, an organic liquid buffer and a source of aluminum. The assembly may further include a positioning ring for positioning and maintaining the refractory body in a central position until the barrier layer becomes rigid.

39 Claims, 3 Drawing Sheets

REFRACTORY BODY ASSEMBLY

This is a Continuation-In-Part of Ser. No. 630,813 filed Dec. 20, 1990 and now abandoned.

RELATED CASE

This application is related to patent application Ser. No. 7/630,544 entitled "PHOSPHOROUS POLYMERS", filed Dec. 20, 1990 in my name, refiled as Ser. No. 08/086,515 on Jul. 1, 1993, and both assigned to the same assignee as this application. The related application is concerned with polymer compositions useful in producing the rigid, cellular mass that characterizes this application.

FIELD OF THE INVENTION

The field is refractory body assemblies for use in cleaning exhaust gases from internal combustion engines by detoxification or filtering.

BACKGROUND OF THE INVENTION

The past two decades have seen the introduction of particulate filters and catalytic converters as cleansing means for exhaust gases, and the rapid growth of such use.

A catalytic converter is a porous, or multichannel, refractory body having a catalytic material, e.g., platinum particles, deposited on the walls of the body. The body may also be referred to as a honeycomb body. Exhaust gases are passed through the body to catalytically convert the gases to a non-toxic form. For example, carbon monoxide (CO) may be oxidized to carbon dioxide ($CO_2$). The particulate filter also utilizes a porous, or multichannel, refractory body, but does not require a catalyst.

It is common practice to mount the refractory body in a metal container known as a can. The can may then be inserted in a vehicular exhaust line by welding end portions of the can into the line.

When thus installed in a vehicle, the refractory body may be subject to considerable vibration. Since the body must have very thin walls, it tends to be rather fragile, particularly when formed from fired ceramic material.

Accordingly, it has become common practice to provide a barrier layer between the can and the refractory body. For this purpose, a can somewhat larger than the body is employed to leave an intermediate space between the body and the can. The body is then wrapped in a refractory fabric, or other packing, to fill the space and act as a cushion.

This practice entails a separate operation, which is time consuming and adds to the cost. The need for a more efficient practice has been evident. Nevertheless, the wrapping procedure has continued in use for lack of an effective alternative.

PURPOSES OF THE INVENTION

A basic purpose is to provide an improved, porous, or multichannel, refractory body assembly.

Another purpose is to provide such an assembly in which the refractory body is more effectively protected against vibration and shock.

A further purpose is to provide a more efficient method of introducing a protective barrier between the can and the refractory body in a refractory body assembly.

Another purpose is to provide means for centrally positioning the refractory body within the can while the protective barrier is being introduced.

A particular purpose is to provide an assembly in which the refractory body is held relatively immobile in the assembly.

SUMMARY OF THE INVENTION

My invention contemplates a refractory body assembly comprising a refractory container, a refractory body having multiple gas passageways, the refractory body being positioned within the container and spaced from the container wall, the intermediate space between the container wall and the refractory body being completely filled with a rigid, cellular mass that has been cellulated in situ at a temperature not over about 1000° C., the cellular mass having a rigid matrix, being capable of withstanding, without appreciable change, the thermal shock of repeated cycling to temperatures that may vary in a gradient manner from up 20° to 1200° C. at the core body interface to not over 1000° C. at the container interface, and being resistant at such elevated temperatures to attack by the exhaust gases that exist either prior to or after being treated.

In preferred embodiments, the rigid, cellular mass may contain a glassy phase that forms a seal with the refractory body. Also, the refractory body may have channels as passageways, and the cellular mass may be a crystalline material, such as aluminum phosphate, or a mixture of phosphates, such as aluminum phosphate and boron phosphate. Further, the assembly may include means for centrally positioning the refractory body within the refractory container and maintaining the refractory body in such position during formation of the rigid, cellular mass.

The invention further contemplates a method of producing a refractory body assembly which comprises providing a refractory body having multiple gas passageways, positioning the body within a refractory container so that the body is spaced from the container wall, filling the intermediate space between the container wall and the refractory body to a predetermined depth with a material that is foamable at a temperature not over about 1000° C. to produce a cellular mass that has a rigid matrix, applying radiant energy to the foamable mass to generate gas bubbles that are trapped in the mass, continuing such foaming action until the space between the refractory body and the container is completely filled and cooling the assembly, thereby providing a rigid, cellular mass between the refractory body and the container wall, the cellular mass being capable of withstanding, without appreciable change, the thermal shock of repeated cycling to temperatures that may vary in a gradient manner from up to 1200° C. at the core body interface to not over 1000° C. at the container interface, and being resistant at such elevated temperatures to attack by the exhaust gases that exist prior to or after being treated.

The refractory body may be centrally positioned within the refractory container and maintained in that position during forming, in the space between the refractory body and the container wall, of a rigid, cellular mass. The rigid, cellular mass may be the product of a buffered mixture that is capable of yielding a crystal phase, such as aluminum phosphate, when heated. The cellular mass may be produced by pouring the buffered mixture into the space intermediate the container and refractory body, preferably to a depth just sufficient to completely fill the space when the mixture is thermally foamed, and heating to a temperature of about 300° C. The rigid, cellular mass may be further heated to seal the cellular mass to the refractory body and/or container. The foamable mix may be a buffered system composed of a source of phosphorous, such as a phosphate, a source of aluminum and organic material. It may additionally contain a source of an oxide, such as boric oxide, silica, an alkaline earth metal oxide, a transition metal oxide, ceria, titania, zirconia, or an alkali metal oxide.

PRIOR ART

Figure 1:
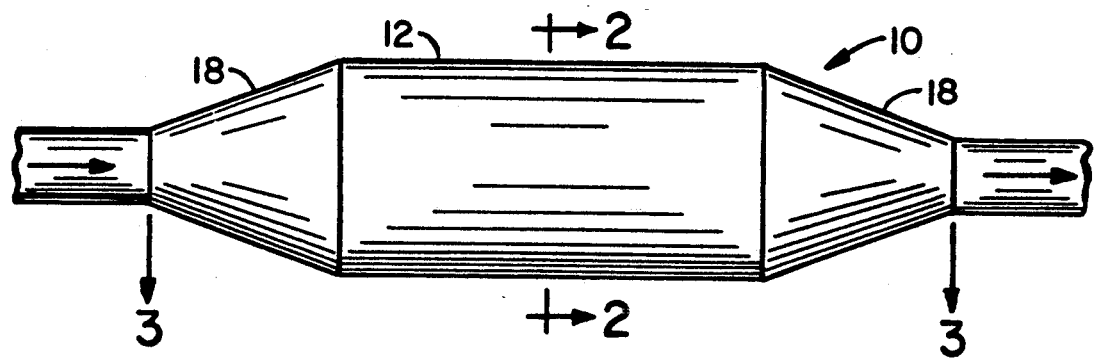
FIG. 1 is a side elevational view of a refractory body assembly in accordance with the invention.

The following United States Patents relate to honeycomb body assemblies and/or foaming cements:

U.S. Pat. Nos. 3,189,512 (Stong) and 3,272,686 (Smith et al.) disclose low expansion ceramic cements, either foaming or non-foaming, for use in joining ceramic bodies, such as a rim on a honeycomb body. The cements consist essentially of lead oxide, another flux, silicon carbide or sulfur dioxide, and a lithium aluminosilicate.

U.S. Pat. No. 3,634,111 (Foster et al.) discloses a foaming cement for use in sealing a solid rim on a honeycomb body to produce a heat exchanger. The cement is a TiO$_2$- nucleated lithium aluminosilicate material containing silicon carbide.

U.S. Pat. No. 3,801,289 (Wiley) shows a catalytic converter assembly that includes a container surrounding a circularly cylindrical honeycomb core, such as a refractory ceramic, and formed by a pair of circular and frusto-conical, concentric metal housings. The container compensates for differences in thermal expansion of the converter and the housings. Thermal insulation may be placed between the housings.

U.S. Pat. No. 3,876,384 (Santiago et al.) discloses a monolithic, catalyst carrier body resiliently mounted in a reactor casing by surrounding the body with a protective jacket which has steel reinforcing means, such as a mesh or mat, embedded in a ceramic fiber, and binder means, such as mineral fibers and mortar.

These patents do not disclose a foamed cellular mass in an exhaust gas, refractory body assembly. Further, they do not disclose a material that can be foamed below 800° C.

The following United States patents relate to mixtures for use in producing foamed bodies:

U.S. Pat. No. 3,223,537 (Wiegert et al.) discloses adding 22-27 parts of phosphoric acid to a mixture of 8-14 parts water; 25-31 parts granular alumina, 30-40 parts granular aluminum hydroxide and 0.01-0.1 parts aluminum powder to produce a foamed product that is cured at temperatures of 200°-600° F.

U.S. Pat. No. 3,261,696 (Wiegert et al.) that discloses adding alumina to a zirconia mixture. This mixture contains 76-80 parts zirconia, 7.5-10 parts alumina and 0.1-0.2 parts aluminum powder to which is added 3.1-5.0 parts water and 8-10 parts phosphoric acid to cause foaming.

U.S. Pat. No. 3,382,082 (Eubanks et al.) discloses producing a foamed-in-place body by pouring a slurry of a composition into a mold to foam and be cured at 65°-100° C. The composition includes 39-60 parts phosphoric acid, 10-55 parts aluminum hydroxide, 0.1-0.5 parts aluminum powder, 0.7-4.0 parts bentonite and sufficient aluminum phosphate to make up 100 parts in the mixture.

U.S. Pat. No. 3,762,935 (Leach) states that the foams disclosed in the Eubanks et al. patent are subject to collapse. To correct this, 1-20% of glass frit is added, and the foamed body is heated to a temperature in the range of 1000°-2000° C. This causes the glass to deposit on the cell walls of the foam and strengthen the walls.

U.S. Pat. No. Re. 33,366 (Barrall) prepares foamed or unfoamed phosphate ceramic material by mixing a metal oxide, such as Al$_2$O$_3$, or a hydrate thereof, with calcium silicate and reacting with phosphoric acid.

There is no suggestion that the foams disclosed in these patents might be effective in a refractory body assembly.

DESCRIPTION OF THE INVENTION

The present invention is concerned with a complete refractory body assembly that includes a container, a refractory body and a barrier layer intermediate the body and the container. However, no essential change is contemplated in either the container or the body, as such. Hence, these components may take any of the forms known in the art. Rather, the inventive improvement resides in the barrier, or cushioning, layer, and its relationship to the container and/or the refractory body.

FIG. 1 is a side elevational view schematically showing a typical refractory body assembly 10. It illustrates the standard practice of inserting such an assembly into a vehicular exhaust line. Arrows show the flow of exhaust gases through the assembly.

Figure 2:
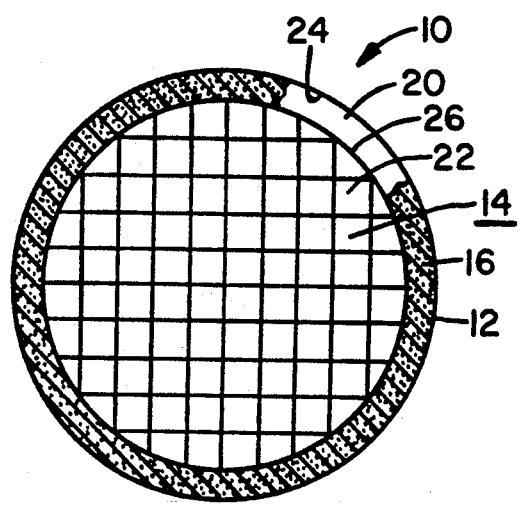
FIG. 2 is a cross-sectional view taken along line 2—2 of FIG. 1.
Figure 3:
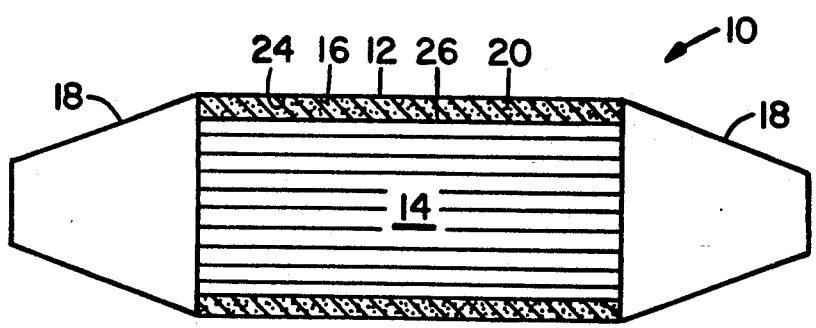
FIG. 3 is a cross-sectional view taken along line 3—3 of FIG. 1.

FIG. 2 is a cross-sectional view of assembly 10 taken along line 2—2 of FIG. 1. FIG. 3 is a cross-sectional view taken along line 3—3 of FIG. 1, that is, lengthwise along the line of gas flow.

As shown in the drawings, assembly 10 is constituted by container 12, refractory body 14 and an intermediate barrier, or protective, layer 16. The assembly is shown connected to an exhaust line by frusto-conical members 18. The latter may be welded, or otherwise connected, to container 12 and the exhaust line. The assembly is shown with a typical round, cylindrical form. However, it will be appreciated that it may take any known shape, including oval, rectangular, triangular and square.

Container 12 is composed of a refractory material to resist the corrosive and thermal conditions of use. It is usually fabricated from stainless steel, as shown here, but is in no way so limited. The shape will usually correspond to that of the refractory body 14, but be somewhat larger in size to provide an intermediate space 20. Container 12 is here shown as a round cylindrical tube, but may take other shapes, as heretofore mentioned.

A typical commercial embodiment of body 14 is an extruded, sintered, cordierite body. Alternatively, body 14 may be formed from metal, e.g. a sintered powder or shaped foil.

As shown in FIGS. 2 and 3, carrier 14 has a honeycomb pattern of small passageways 22. Numerous different patterns have been proposed, as is illustrated in the prior art. See, for example, U.S. Pat. No. 3,983,283 (Bagley). Actually, any porous structure, that provides an adequate network of passageways for gas flow and treatment, may be employed. The structure and/or processing of body 14 form no part of this invention, and hence are not further described.

The customary practice of wrapping a refractory body in a refractory fabric, or other flexible layer, has been noted earlier. This has been intended to protect the carrier from vibration effects, as well as thermally insulate it. However, such practice entails additional assembly steps, the fabric may wear or crumble during service, and the carrier is not necessarily rendered immobile.

A key feature of the present invention is provision of a rigid, refractory, cellular mass as a barrier layer 16 in assembly 10. The cellular mass may be produced from any foamable material that can be cellulated in situ at a temperature not over about 1000° C. At higher temperatures, the metal may be damaged. The foamable material should be capable of increasing in volume when cellulated. The cells or gas bubbles may be held within a glassy or crystalline matrix, preferably the latter, having a relatively low modulus of rupture. When body 14 is a catalytic converter, the matrix material must also withstand, without appreciable change, the thermal shock resulting from repeated cycling to temperatures that vary in a gradient manner from as high as 1200° C., at the interface between body 14 and cellular mass 16, and not over 1000° C. at the interface between cellular mass 16 and can 12. The cellular matrix must also resist attack at such elevated temperatures by exhaust gases either prior to or subsequent to catalytic conversion. These gases are primarily oxides of carbon, hydrogen and nitrogen.

I have discovered a family of phosphorous polymeric materials that can, in addition to other attributes, be thermally converted to such a refractory foam without addition of extraneous foaming agents. The matrix of the resulting rigid foam, in its simplest form, may be essentially composed of an aluminum phosphate crystalline phase. The materials involved, and the techniques required to produce the polymeric materials, and subsequently the foam, involve forming a buffered liquid mixture composed essentially of a source of aluminum, a source of phosphorous and an organic liquid buffer.

An organic liquid buffer may be any of the known and commercially available organic compounds. Thus, it may, for example, be selected from one or more of the following organic groups: alkanes, alkenes, alkynes, aromatics, alcohols, ethers, carbonyl compounds, carboxylic acids and esters, amines and amides, monomers and polymers. Aliphatic acids, such as acetic and tartaric, are particularly effective. However, other organics such as beta-alanine, ethylene glycol characteristics desired. For example, beta-alanine is also a good solvent for boric oxide.

In order to produce barrier layer 16 with the phosphorous polymeric materials, a buffered liquid mixture composed essentially of a source of aluminum, a source of phosphorous, and an organic liquid buffer is prepared. Refractory body 14 is positioned centrally within can 12. The buffered liquid mixture is then poured into the intermediate space 20 to a depth predetermined to permit completely filling space 20 with foam when the mixture is subsequently thermally treated.

Depending on the particular mixture employed, the time and temperature conditions of foaming, and other factors, the amount of buffered mixture required is sufficient to between body 14 and can 12. When the amount of space filled with buffered mixture is low, that is, near the one-tenth end of the range, the ultimate cellular mass tends to lack strength because of the small amount of matrix. With a greater amount of the buffered mixture, that is, near one-half, the matrix tends to increase in modulus and become brittle. Accordingly, a level of about one-third, which reduces bulk density to about one-third, is preferred.

The assembly is now subjected to a modest elevated temperature, for example, 300° C. for an hour. This converts the polymeric mixture to a rigid, crystalline foam 16 that completely fills intermediate space 20. The foam, when analyzed by XRD techniques, shows an aluminum phosphate-type crystalline phase.

In its simplest form, the buffered liquid system comprises the three essential ingredients; a source of phosphorous, a source of aluminum and an organic liquid buffer. In that case, the matrix of the cellulated mass is crystalline aluminum phosphate. However, the buffered liquid system, and the resulting crystalline matrix, may be modified by including, in the buffered liquid system, various additives, or additive sources. The additives may include nitrogen, halogens and oxides, such as silica, boric oxide, ceria, titania, zirconia, transition metal oxides, alkaline earth and alkali metal oxides. The additives may also include inert fillers and known reinforcing media, such as fibers, whiskers, or plates. For example, an addition of boric oxide provided a mixture of aluminum phosphate ($AlPO_4$) and boron phosphate ($BPO_4$) in the matrix.

Higher temperatures are generally unnecessary for foaming, but are not detrimental. Thus, foams have been subjecting to temperatures up to 1200° C. without apparent effect. Actually, if a glass forming oxide, such as boric oxide ($B_2O_3$) or silica ($SiO_2$), is incorporated in the mix, a glassy phase may be generated. This phase will effect a seal between barrier layer 16 and the outside surface 26 of body 14. This is desirable to insure against any movement within the assembly. Temperatures in the range of 600°–900° C. are usually required to effect a seal to the body surface.

A seal to the inside surface 24 of can 12 might also be effected if compatible coefficients of thermal expansion obtain. However, since this is usually not the case, such a seal is preferably avoided because of cracking.

Various problems were encountered in developing a successful barrier layer 16 between container 12 and refractory body 14. It was, of course, necessary to precisely center body 14 in container 12. Further, it was necessary to maintain such central positioning, not only while the foamable material was being placed in space 20, but throughout the cellulating step until the barrier layer became rigid. Thereafter, the barrier layer maintains the refractory body 14 in fixed position.

It was convenient to employ a relatively fluid cellulating material that could be poured in place. Further, this material became more fluid as it was heated prior to cellulation and setting. Consequently, leakage of the fluid tended to occur.

I have found that these problems may be solved through use of O-rings mounted on body 14 at its extremities. While these are effective for positioning, the refractory body may be damaged during mounting of the rings. Also, the rings being a rubber material, tend to carbonize if the thermal cellulating temperature is too high.

Therefore, I prefer to use an L-shaped, closed, metal ring as a centering device. The ring preferably fits snugly within container 12 with its periphery conforming to the inner wall of the container. The ring will have a vertical segment, the inside diameter of which approximates the outside diameter of the refractory body. Thereby, the vertical segment provides a snug fit for the refractory body. The ring also will have a horizontal segment that extends inwardly to provide a ledge on which the refractory body is positioned.

The shape of the positioning ring will, of course, depend on the shape of the refractory body and the container. As noted earlier, these may take various shapes, such as oval, round, triangular, etc. Necessarily then, the positioning ring will conform.

Figure 6:
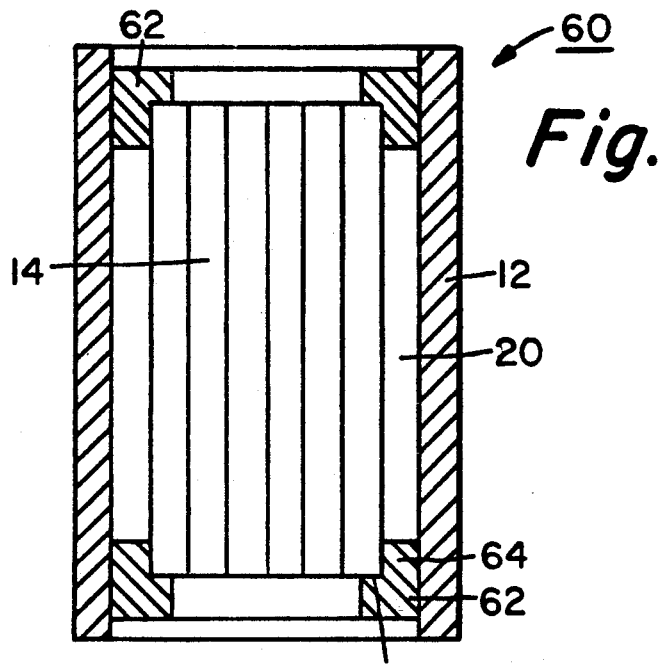
FIG. 6 is a cross-sectional view of a modified refractory body assembly in accordance with the invention that embodies a positioning device.

In its simplest form, the positioning device may be an L-shaped, cylindrical ring as shown at 62 in FIG. 6. Ring 62 has a vertical leg 64, the thickness of which approximates the thickness of the space intermediate body 14 and container 12. Ring 62 also has a horizontal leg 66 which functions as a ledge on which body 14 rests. Thus, ring 62 fits closely within container 12, and may be welded thereto if desired. In turn, body 14 fits snugly within leg 64 and against leg 66, and is thereby centered.

In the assembly operation, ring 62 is mounted in the bottom, or base end, of container 12. Refractory body 14 is then placed in container 12 and positioned to rest on ledge 66. The foamable material, from which barrier layer 16 is formed, may be poured into space 20 between body 14 and container 12. At this point a second ring 62 may be fitted over the upper end of body 14, and within the upper end of can 12. Rings 62 are identical with the upper one being reversed in position with respect to the bottom one.

This arrangement positions body 14 firmly and centrally within container 12 during the cellulation step. Barrier layer 16, once formed and solidified, will maintain body 14 immobile. Hence, rings 62 may be removed and reused. Alternatively, they may be welded to container 12, either before or after forming barrier layer 16. In that case, they remain part of the article and serve a reinforcing function.

Figure 7:
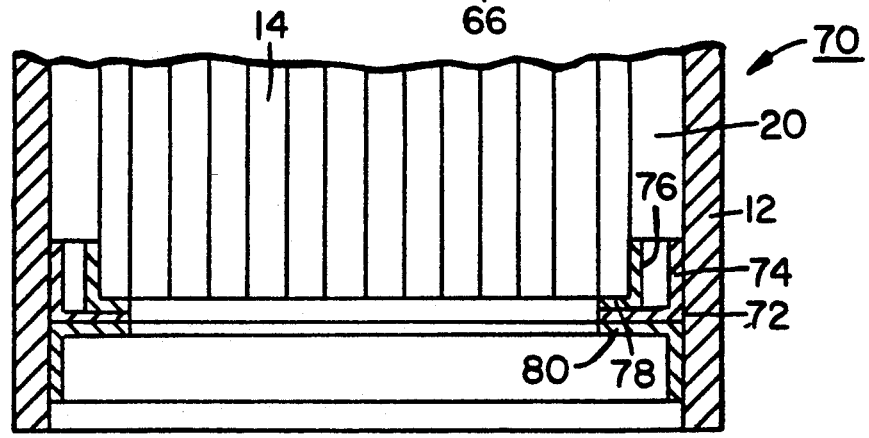
FIG. 7 is a partial cross-sectional view of an assembly in accordance with FIG. 6 with a modified form of the positioning device.

FIG. 7 is a partial cross-sectional view of an assembly 70 corresponding to FIG. 6, except for a modified form of positioning device generally designated 72. Positioning device 72 is designed to use thinner metal parts than device 62, thus being less expensive to make and relying on structure for reinforcing strength. Positioning device 72 has an L-shaped component 74 that corresponds to component 62 of FIG. 6, but is produced from thinner metal stock. A second L-shaped member 76 is inset from the vertical leg of 74, and provides ledge 78 on which body 14 rests. A further L-shaped member 80 may be attached on the underside of 74 to provide further support if desired.

Figure 8:
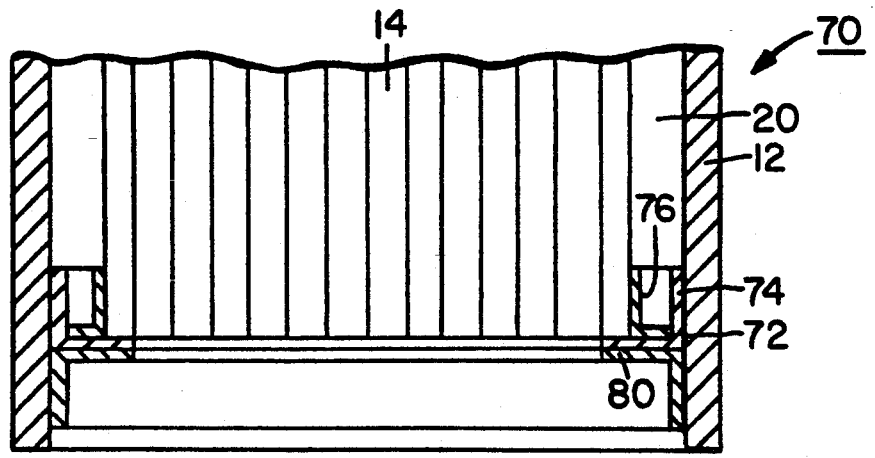
FIG. 8 is a partial cross-sectional view of an assembly in accordance with FIG. 6 with a further modified form of the positioning device.

FIG. 8 corresponds to FIG. 7 in all respects, except that the horizontal leg on ring member 76 is turned outwardly toward container 12, rather than inwardly to form a ledge. Accordingly, refractory body 14 rests on that portion of the horizontal leg of 74 that extends beyond the vertical leg of 76. While three forms of a positioning device have been shown, it will be readily appreciated that numerous other variations are possible and are considered within the scope of the appended claims.

By way of further describing the invention, the following specific example is described:

A round, cylindrical, commercial catalyst carrier 14 was centrally positioned within a stainless steel can 12. The carrier was 7" (17.5 cm.) in length, 3,625" (9 cm.) in diameter and had 400 passageways per square inch (64 per cm$^2$.) of face surface. The can was a cylindrical tube 7.25" (18.1 cm.) in length and 4" (10 cm.) in diameter.

A buffered mixture was prepared by mixing tartaric acid, boehmite powder (aluminum hydroxide), boric oxide and 85% phosphoric acid in a mole relation of 1:2:2:4. The mixture was continually stirred, and the boehmite was added last, because of the vigorous exothermic reaction which its addition generated.

When the reaction in the mixture had subsided, the resulting, viscous liquid was poured into intermediate space 20 to a depth of about 2.5" (6.3 cm.). The assembly was then placed in an oven operating at 300° C. and held at that temperature for an hour. When the assembly was cooled, intermediate space 20 was completely filled with a porous, gray foam. Subsequent x-ray analysis showed aluminum phosphate (AlPO$_4$) and boron phosphate crystalline phases.

Figure 4:
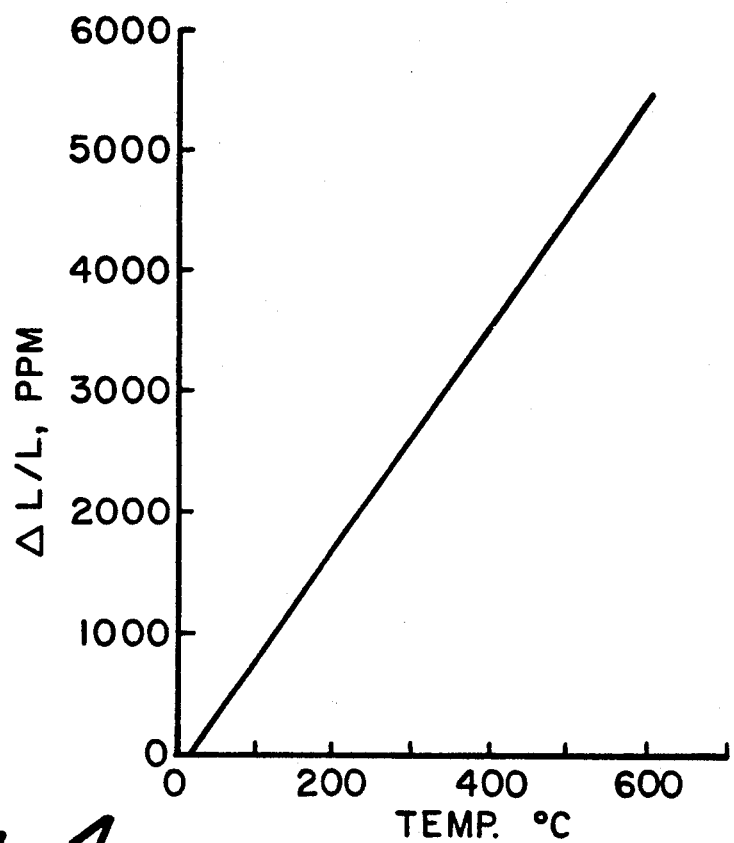
FIG. 4 is a graphical representation showing the thermal expansion curve for a typical material used in practicing the invention.

A foamed body, prepared separately, had a measured density of 0.3 gms. per c.c. and an average coefficient of thermal expansion (CTE), between 25° and 600° C. of about $69 \times 10^{-7}$/° C. The expansion coefficient is very consistent over the entire temperature range. This is seen from the complete curve as reproduced in FIG. 4, a graphical representation wherein CTE is plotted on the vertical axis and temperature (T) is plotted in ° C. on the horizontal axis.

Figure 5:
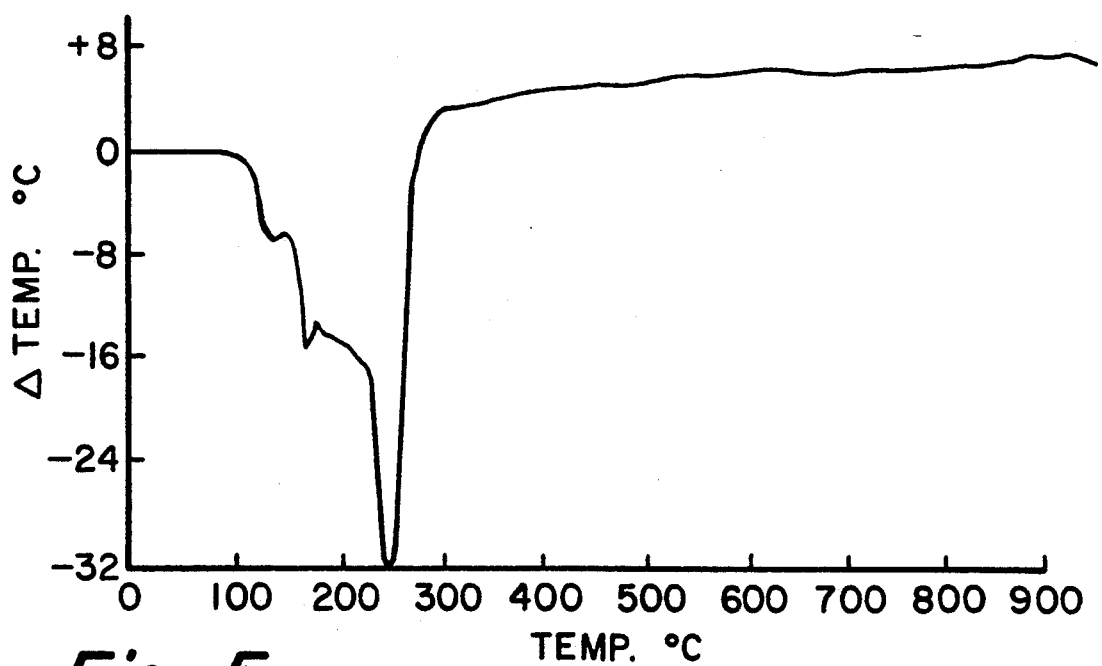
FIG. 5 is a graphical representation showing the differential thermal analysis (DTA) curve for a polymeric material in accordance with the invention as it is heated to 900° C.

FIG. 5 shows the differential thermal analysis (DTA) curve recorded as the polymeric material was heated from 25° C. to 900° C. The increasing temperature of the treating chamber is plotted on the horizontal axis. The differential ($\Delta$) change in temperature is plotted on the vertical axis with a base line extending from the point at which the heat treatment starts. It will be observed that the DTA values are increasingly negative as the heat treatment is carried up to a temperature of 235° C. indicating evolution of water. At that temperature, the polymer undergoes crystallization to produce crystal phases identified as aluminum phosphate and boron phosphate crystal phases. The essentially flat curve up to 900° C. indicates no change in the crystal phases up to that temperature. The analysis was made using a Dupont thermal analyzer.

Numerous experiments were carried out to illustrate the variety of materials that might be included in the phosphorous polymer, buffered liquid system as additives, and the effect of such additions on foam bulk density. The 1:2:2:4 buffered mixture, used and described in the previous example, was employed as a base formulation. A further fifth component was included in this formulation for each experiment, the amount being a percentage by weight of the based.

In each case, the resulting polymeric material was heated to 600° C., held at that temperature for one hour in air and cooled, TABLE I, below, lists, in weight percent, some of the additives employed; also the bulk density, in grams/cubic centimeter (g/cm$^3$), of the foam produced, and the appearance of the foam.

TABLE I

| Additive | Bulk Density | Appearance |
|---|---|---|
| 1. 5% CaCl$_2$ | 0.273 | Hard, Black |
| 2. 10% CaCl$_2$ | 0.255 | Hard, Black |
| 3. 20% CaCl$_2$ | 0.548 | Hard, Grey |
| 4. 10% Ca(H$_2$PO$_4$).H$_2$O | 0.244 | Glassy inclusion |
| 5. 10% NH$_4$BF$_4$ | 0.213 | Hard, Grey |
| 6. 10% NaMoO$_4$.2H$_2$O | 0.349 | Hard, Bluish, White |
| 7. 10% NaWO$_4$.2H$_2$O | 0.51 | Hard, Eggshell |
| 8. 10% Zn$_3$(PO$_4$)$_2$.2H$_2$O | 0.212 | Hard, Grey |
| 9. 10% BaCl$_2$.2H$_2$O | 0.44 | Glassy surface |
| 10. 10% Bone Ash | 0.28 | Coarse, Grey Sightly glassy. |
| 11. 10% BaHPO$_4$ | 0.43 | Coarse, Dull Black |
| 12. 10% AlF$_3$ | 0.32 | Hard |

In general, the space occupied by the mixture before foaming increased by about three to five times during foaming. This indicated a decrease in density to about 35 to 20% of the original polymeric material.

I claim:

1. A refractory body assembly comprising a refractory container having an inner wall, a refractory body having multiple gas passageways, the refractory body being positioned within the container and being spaced from the inner wall of the container, the space between the refractory body and the container wall being occupied by a rigid, thermally cellulated mass that has a bulk density in the range of one tenth to one half the bulk density of the uncellulated state, whereby the rigid cellular mass is capable of being repeatedly cycled to temperatures that may vary in a gradient manner from up to 1200° C. at the interface between the rigid cellular mass and the refractory body to not over 1000° C. at the interface between the inner wall of the container and the cellular mass and is resistant at such temperatures to attack by the exhaust gases that exist either prior to or after the exhaust is treated.

2. A refractory body assembly in accordance with claim 1 wherein the rigid cellular mass has a crystal structure.

3. A refractory body assembly in accordance with claim 2 wherein the rigid cellular mass is aluminum phosphate or a mixture of phosphates including aluminum phosphate.

4. A refractory body assembly in accordance with claim 3 wherein the the rigid cellular mass further contains an oxide selected from the group consisting of silica, boric oxide, ceria, titania, zirconia, alkaline earth and alkali metal oxides and transition metal oxides and/or a phosphate based on such oxide.

5. A refractory body assembly in accordance with claim 1 wherein the rigid cellular mass contains a glassy phase and is sealed to the refractory body by a glassy fusion seal.

6. A refractory body assembly in accordance with claim 1 wherein the rigid cellular mass is a thermally cellulated product of a liquid mixture consisting essentially of a source of phosphorous, an organic liquid buffer and a source of aluminum.

7. A refractory body assembly in accordance with claim 6 wherein the mixture additionally contains a source of an oxide selected from the group consisting of boric oxide, silica, ceria, titania, zirconia, alkali or alkaline earth metal oxides and transition metal oxides.

8. A refractory body assembly in accordance with claim 6 wherein the liquid mixture additionally contains a compound which serves as a source of nitrogen or a halogen.

9. A refractory body assembly in accordance with claim 1 wherein the rigid cellular mass contains a reinforcing medium selected from fibers, whiskers, or plates.

10. A refractory body assembly in accordance with claim 1 wherein the bulk density of the cellular mass is about one third that of the liquid mixture from which it is cellulated.

11. A refractory body assembly in accordance with claim 1 wherein the refractory container is a hollow metal can.

12. A refractory body assembly in accordance with claim 1 wherein the refractory body is multichanneled.

13. A refractory body assembly in accordance with claim 12 wherein the refractory body is composed of metal.

14. A refractory body assembly in accordance with claim 12 wherein the refractory body is composed of a ceramic.

15. A refractory body assembly in accordance with claim 14 wherein the refractory body is an extruded, sintered, ceramic body.

16. A refractory body assembly in accordance with claim 1 which additionally comprises a device for centrally positioning and maintaining the refractory body within the container during formation of the rigid, cellular mass.

17. A refractory body assembly in accordance with claim 16 wherein the positioning device includes one or more O-rings mounted on the refractory body.

18. A refractory body assembly in accordance with claim 16 wherein the positioning device is a metal ring that is L-shaped in cross-section.

19. A refractory body assembly in accordance with claim 18 wherein the positioning device has a ledge portion on which the refractory body rests.

20. A method of producing a refractory body assembly which comprises providing a refractory body having multiple gas passageways, positioning the body within a refractory container having an inner wall so that the body is spaced from the container inner wall, partially filling the intermediate space between the refractory body and the container inner wall to a predetermined depth with a mass of a material that is increased in volume and decreased in density in situ by thermal cellulation at a temperature not over 1000° C. to produce a cellular mass that has a rigid matrix, applying radiant energy to the mass to generate gas bubbles that are trapped in the mass thereby causing a foaming action, continuing such foaming action until the space between the refractory body and the inner container wall is completely filled and cooling the assembly, thereby providing a rigid, cellular mass between the refractory body and the inner container wall, the cellular mass being capable of being repeatedly cycled to temperatures that vary in a gradient manner from up to 1200° C. at the interface between the rigid cellular mass and the refractory body to not over 1000° C. at the interface between the inner wall of the container and the cellular mass, and being resistant at such temperatures to attack by the exhaust gases that exist either prior to or after the exhaust is treated.

21. A method in accordance with claim 20 wherein the foamable material is of a liquid mixture consisting essentially of a source of phosphorous, an organic liquid buffer and a source of aluminum.

22. A method in accordance with claim 21 wherein the buffered liquid mixture is heated to a temperature of about 300° C. to generate gas bubbles that are trapped in the mass.

23. A method in accordance with claim 21 wherein the liquid mixture additionally contains a source of an oxide selected from the group consisting of boric oxide, silica, ceria, titania, zirconia, alkali and alkaline earth metal oxides and transition metal oxides.

24. A method in accordance with claim 23 wherein the liquid mixture is heated to a temperature of at least about 600° C. to form a glassy phase that produces a fusion seal between the refractory body and the foam matrix.

25. A method in accordance with claim 21 wherein the liquid mixture is produced by adding aluminum hydroxide to a mixture of phosphoric acid and an organic buffer.

26. A method in accordance with claim 21 wherein the liquid mixture additionally contains a compound that serves as a source of nitrogen or a halogen.

27. A method in accordance with claim 21 wherein the liquid mixture additionally contains a reinforcing medium selected from fibers, whiskers and plates.

28. A method in accordance with claim 20 wherein the foamable material is poured into the space intermediate the container wall and the refractory body to a predetermined level so that, after heating to form a rigid foam, the foam completely fills the intermediate space.

29. A method in accordance with claim 28 wherein the foamable material is poured into the space intermediate the container wall and the refractory body to fill about one-tenth to one-half of the space.

30. A method in accordance with claim 29 wherein the foamable material fills about one-third of the space.

31. A method in accordance with claim 21 wherein the buffered mixture is composed essentially of tartaric acid, boehmite, boric oxide and 85% phosphoric acid.

32. A method in accordance with claim 31 wherein the tartaric acid, boehmite, boric oxide and 85% phosphoric acid are present in a molar relation of 1:2:2:4.

33. A method in accordance with claim 20 wherein the rigid foam between the refractory body and the container wall has a crystal structure.

34. A method in accordance with claim 33 wherein the crystalline matrix is aluminum phosphate or a mixture of aluminum phosphate and another crystalline phosphate.

35. A method in accordance with claim 34 wherein the crystalline matrix further contains an oxide selected from the group consisting of silica, boric oxide, ceria, titania, zirconia, alkaline earth and alkali metal oxides and transition metal oxides and/or a phosphate based on such oxide.

36. A method in accordance with claim 20 wherein the refractory body is centrally positioned within the refractory container and maintained in such position until the rigid, cellular mass is formed between the refractory body and the container wall.

37. A method in accordance with claim 36 wherein the refractory body is centrally positioned by mounting at least one O-ring on the refractory body to space the body from the container wall.

38. A method is accordance with claim 36 wherein the refractory body is centrally positioned by mounting a metal ring that is L-shaped in cross-section in one end of the container, the periphery of the metal ring confirming to the inner wall of the container, and, in part at least, having an inside diameter approximating the outside diameter of the refractory body.

39. A method in accordance with claim 38 wherein the metal ring has a horizontal leg upon which the refractory body is positioned.

* * * * *

UNITED STATES PATENT AND TRADEMARK OFFICE
CERTIFICATE OF CORRECTION

PATENT NO. : 5,281,399
DATED : January 25, 1994
INVENTOR(S) : Rittler

It is certified that error appears in the above-indentified patent and that said Letters Patent is hereby corrected as shown below:

Column 2, line 20, remove "20°".
Column 6, line 2, after "glycol", insert --and EDTA may be employed, depending on the particular--.
Column 6, line 17, after "to", insert --fill from about one-tenth to about one-half of the space 20--.
Column 6, line 50, "subjecting" should be --subjected--.
Column 9, line 3, "based" should be --base--.

Signed and Sealed this

Thirty-first Day of May, 1994

Attest:

BRUCE LEHMAN

Attesting Officer    Commissioner of Patents and Trademarks